United States Patent [19]

Bohannon, Jr. et al.

[11] Patent Number: 4,487,641
[45] Date of Patent: Dec. 11, 1984

[54] METHODS OF AND APPARATUS FOR MAKING A RODENT AND LIGHTING PROTECTIVE CABLE SHEATH SYSTEM

[75] Inventors: William D. Bohannon, Jr.; Michael D. Kinard, both of Lawrenceville, Ga.

[73] Assignee: AT&T Technologies, Inc., New York, N.Y.

[21] Appl. No.: 551,798

[22] Filed: Nov. 15, 1983

[51] Int. Cl.³ .............................................. H01B 13/22
[52] U.S. Cl. ........................................ 156/54; 29/745; 29/825; 156/56; 156/201; 156/205; 156/322; 156/461; 156/462; 156/555; 174/102 D; 174/105 R
[58] Field of Search .................... 29/745, 825; 72/168, 72/176, 179, 52; 156/52, 54, 56, 202, 205, 206, 321, 322, 461, 462, 555, 201; 174/102 D, 105 R

[56] References Cited

U.S. PATENT DOCUMENTS

| | | | |
|---|---|---|---|
| 3,340,353 | 9/1967 | Mildner | 174/105 R X |
| 3,505,147 | 4/1970 | Eulie | 156/321 |
| 3,534,149 | 10/1970 | Peacock et al. | 174/105 R |
| 3,575,762 | 4/1971 | Goehring et al. | 156/322 X |
| 3,616,039 | 10/1971 | Hutzler et al. | 156/250 X |
| 3,679,513 | 7/1972 | Addinall et al. | |
| 3,826,628 | 7/1974 | Addinall et al. | |
| 4,221,926 | 9/1980 | Schneider | 156/56 X |
| 4,322,574 | 3/1982 | Bow et al. | 174/107 |
| 4,360,395 | 11/1982 | Suzuki | 156/54 |

FOREIGN PATENT DOCUMENTS

| | | |
|---|---|---|
| 556171 | 4/1958 | Canada . |
| 808630 | 3/1969 | Canada . |
| 1011777 | 12/1965 | United Kingdom . |

Primary Examiner—Robert A. Dawson
Attorney, Agent, or Firm—E. W. Somers

[57] ABSTRACT

Methods and apparatus are provided for making a laminate which is used to form a corrugated outer shield (60) of a sheath system (50) for a lightguide fiber cable (20). A strip (81) of a corrosion-resistant metallic material having a relatively high elongation, an oxide surface layer (65) and a relatively coarse outer surface is preheated to a temperature within a predetermined range. Afterwards, a composite adhesive strip is brought into engagement with the metallic strip and moved between a pair of rollers (91—91) which are maintained at a first temperature and which causes the strips to be subjected to a predetermined pressure. Then the two strips are moved between another pair of rollers (97—97) which are at a second temperature greater than the first and which subject the strips to the predetermined pressure. The resulting laminate (61) is corrugated by a device (104) and formed into the outer shield (60) about an inner shield (51) which is made of a highly conductive metallic material. An extruder (115) applies a plastic jacket (70) about the outer shield and causes the jacket to become bonded through the second adhesive material to the oxide layer.

20 Claims, 7 Drawing Figures

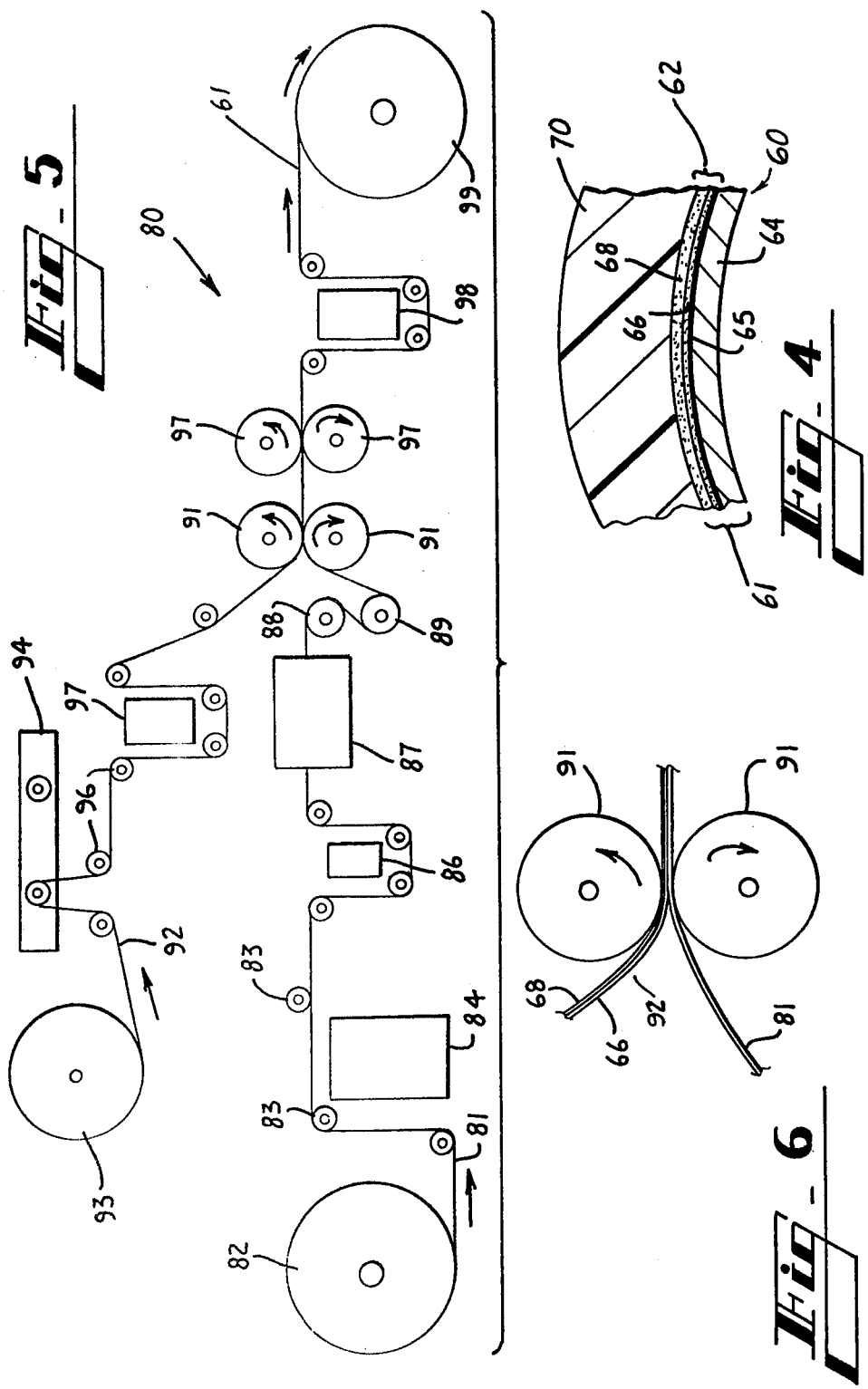

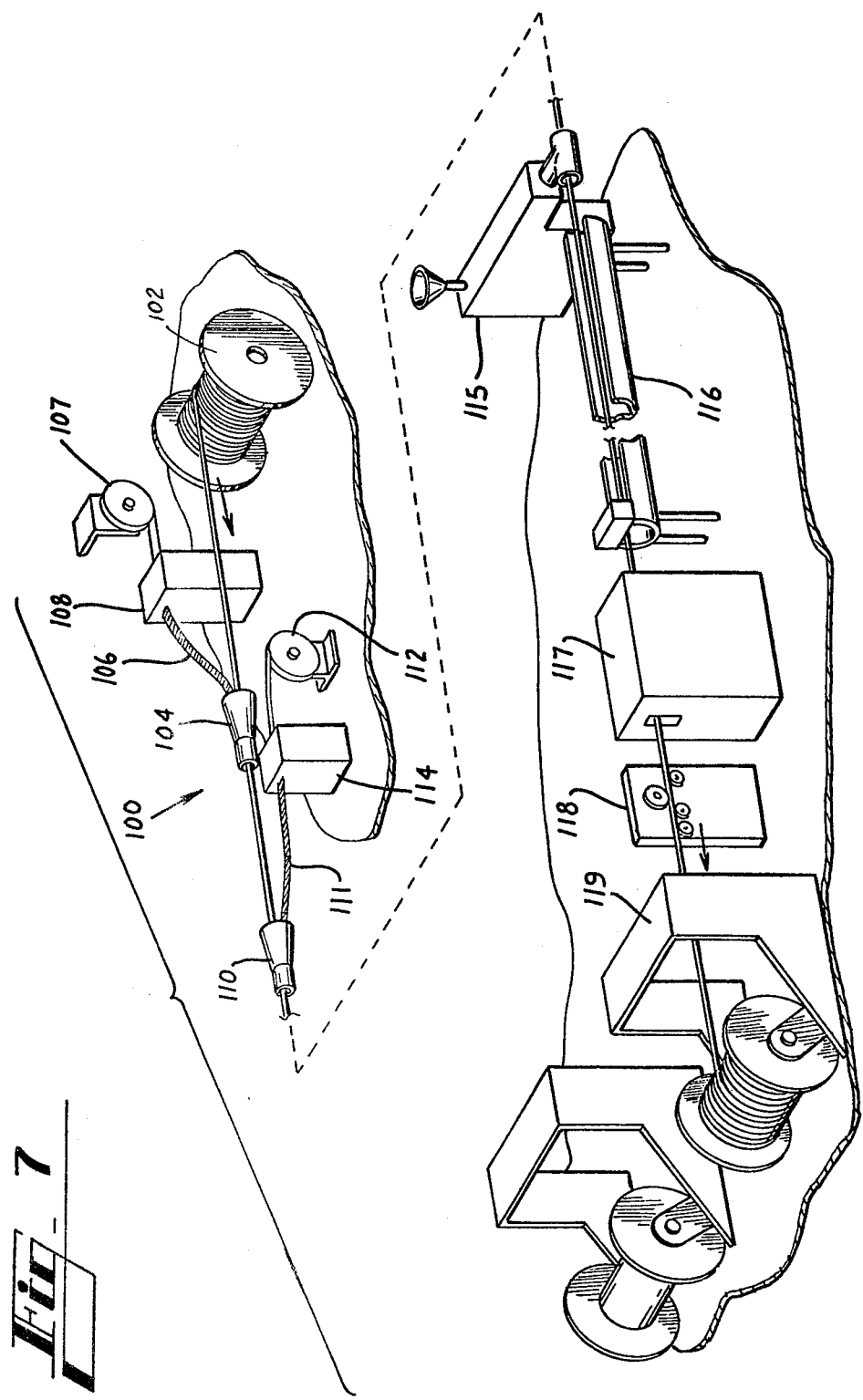

METHODS OF AND APPARATUS FOR MAKING A RODENT AND LIGHTING PROTECTIVE CABLE SHEATH SYSTEM

TECHNICAL FIELD

This invention relates to methods of and apparatus for making a rodent and lightning protective cable sheath system. More particularly, it relates to methods and apparatus for making an adhesive-metallic laminate that is particularly suited for use in a sheath system which is effective to provide protection for relatively small, lightguide cables against rodents and lightning.

BACKGROUND OF THE INVENTION

Communications cables which are strung between poles or those which are buried in the ground are subjected to abuse such as, for example, attack by rodents, lightning strikes, mechanical abrasion and crushing. Cables having an outside diameter below a critical size of about 0.75 inch in diameter are more apt to be damaged by rodents than are larger cables because the animals can bite directly down on them.

It has been found that with limited exceptions, the only way to protect directly exposed cables from rodent attack is to wrap them in a metallic shield. A longitudinally applied shield, if otherwise suitable, would be economically preferable from a manufacturing standpoint. For cables above the critical size, the use of a corrugated shield having a longitudinally overlapped seam has provided sufficient protection. However, in the smaller sizes, such a shield arrangement has led to failures. Rodents have been able to encompass the cable with their teeth and pull open the seam.

Both buried and aerial cables also are damaged by lightning strikes. Thermal damage, that is burning, charring and melting of the sheath components, is caused by the heating effects of the lightning arc and a current being carried to ground by the metallic members of the core or sheath. In buried cables, a second mode of damage is mechanical, causing crushing and distortion of the sheath. This results from an explosive impact, sometimes called a steamhammer effect, which is caused by the instantaneous vaporization of water in the earth in a lightning channel to the cable.

The prior art abounds with patents relating to sheath systems for copper core cables such as one comprising an aluminum shield enclosed by a carbon steel shield with each having a longitudinal seam. This sheath system offers protection from mechanical damage, eletromagnetic interference and lightning and its cost is quite low because it is made in a single pass at high line speeds. However, the use of a shield which is made of carbon steel has occasionally led to long term failures even in cables larger than 0.75 inch. Failure may occur because the underlying steel shield may become exposed when rodents violate the jacket. Once exposed, the steel, which withstands the initial attack by rodents, corrodes readily. This renders it ineffective for general mechanical protection and for protection from any subsequent animal attack. In this regard, it should be pointed out that gophers are territorial animals which repeatedly return to areas previously occupied by them. Therefore, it is not uncommon to experience secondary attacks in the same location along a cable. These cables may fail also because of the presence of a longitudinal seam formed in a shield having mechanical properties which are not sufficient to cause the shield to be protected from rodent abuse.

Lately, lightguide fiber cables have made inroads into the communications cable market. They too are subject to rodent attack and although they do not use metallic conductors for transmission, metallic strength members are used commonly in the sheath system. Given the small, comparatively fragile nature of lightguide fiber cables relative to their capacity and their contribution to revenues, provisions necessary to protect them are easily justified. Inasmuch as lightguide fiber cables fall into a range of about 0.5 to 0.8 inch in diameter, the use of longitudinal overlapped seams has been in question. A prior art design lightguide cable sheath system which offers rodent protection comprises two helically wrapped, stainless steel shielding tapes enclosed in a plastic jacket. However, it has several shortcomings. It is very expensive to manufacture because of the complex sheathing machinery and low line speeds required to wrap the tapes helically about a core and because the taping and jacketing have to be accomplished in two separate operations. Also, the protection it offers against lightning strikes is affected adversely because of the relatively low impact resistance of its helically applied flat tapes.

A cable which provides suitable protection against rodents and lightning is disclosed and claimed in copending application Ser. No. 551,797 filed of even date herewith in the names of W. D. Bohannon, Jr. et al. In it, a core is enclosed in a shield made of a highly conductive material such as copper, for example, and in a corrugated outer shield which is a laminate comprising a corrosion-resistant metallic material to which is bonded an adhesive system. The corrosion-resistant metallic material is a stainless steel alloy having relatively high elongation and at least a predetermined chromium content. The adhesive system comprises a first adhesive material which is bonded to an outer surface of the corrosion-resistant metallic material and a second adhesive material or carrier which becomes bonded to an outer jacket as plastic material is extruded about the laminate to form the jacket. Important to the corrugating and forming of the above-described outer shield is the peel strength of the bond between the first adhesive material and the outer surface of the corrosion-resistant metallic material.

In one prior art process, the coating of a corrosion-resistant metallic material is accomplished first by preheating a strip of chromium and chromium oxide coated steel. Then a polyethylene film is brought into engagement with each side of the strip and together they are fed between two rollers to cause them to be adhered to the strip. Then the coated strip is reheated and moved through a post-heating zone. This requires a somewhat lengthy manufacturing line. In another process, a dual adhesive film is extruded onto a carbon steel base layer.

What is still needed is an economical and reliable method for laminating a corrosion-resistant metallic material and an adhesive system which is capable of bonding the metallic material to a subsequently extruded jacket. The resulting composite structure should resist degradation by requiring an attacking rodent to remove laboriously each elemental piece of jacket material from an underlying durable metallic shield.

SUMMARY OF THE INVENTION

The foregoing problems have been solved by the methods and apparatus of this invention. In a method of making a laminate for use in a sheath system for a cable, particularly a relatively small lightguide cable, for example, a strip of a corrosion-resistant metallic material is preheated to a temperature within a predetermined range. The corrosion-resistant metallic material has a relatively high elongation and at least a predetermined chromium content, a base layer and an oxide surface layer, and a relatively coarse outer surface. Then a composite strip comprising a first adhesive material and a second adhesive material and the strip of metallic material are advanced into juxtaposition with each other such that the first adhesive material engages the corrosion-resistant material. The melting point of the first adhesive material is significantly less than that of the second. In a next step of the method, the composite adhesive strip and the strip of corrosion-resistant material are moved between a pair of rollers which are at a temperature that is less than the melting point of the first adhesive material and which apply a predetermined pressure to the strips. Afterwards, the strips are moved between a second pair of rollers which are at a temperature that is greater than the melting point of the first adhesive material, but less than that of the second adhesive material, and which apply the same predetermined pressure to the strips to produce a laminate.

The corrosion-resistant material has sufficient thickness and sufficient strength characteristics to provide the cable with enhanced lightning impact resistance. Also, the elongation and strength properties of the corrosion-resistant material are such that the outer shield together with the jacket bonded thereto prevents the removal of substantial portions of the jacket with any one bite by a rodent.

More particularly, a strip of stainless steel which has an elongation and a chromium content falling in predetermined ranges is preheated to a temperature in the range of about 400° F. to 550° F. Then it is moved into juxtaposition with a composite strip comprising an adhesive material and a carrier. The adhesive material in a preferred embodiment comprises a terpolymer comprising ethylene, an ethylenically unsaturated carboxylic acid and an ester of an ethylenically unsaturated carboxylic acid, whereas the carrier comprises a linear low density polyethylene material. The strip of steel, which has been preheated to a temperature that exceeds the melting point of the adhesive material and of the carrier, and the composite adhesive strip are moved between two cooperating rollers which subject the strips to a first temperature and to a predetermined pressure. The first temperature is less than the melting point of the adhesive material. Afterwards, the strips are advanced between a second set of cooperating rollers which apply approximately the same pressure to the strips and which are maintained at a temperature that exceeds the melting point of the adhesive material but that is less than the melting point of the carrier. This causes the adhesive-carrier strip to become laminated to the steel strip. Subsequently, a corrugated strip of metallic material having relatively high properties of conductivity and thermal capacity is caused to be formed into an inner shield which encloses a cable core. The steel-adhesive laminate is corrugated and formed into an outer shield which encloses the inner shield, after which the outer shield is caused to become bonded to the jacket as the plastic jacket material is extruded over it. Because a linear low density polyethylene carrier is used, the plastic material of the jacket also may be a linear low density polyethylene. This allows the use of lower extrusion temperatures and provides desirable jacket properties at low temperatures in the field.

BRIEF DESCRIPTION OF THE DRAWINGS

Other features of the present invention will be more readily understood from the following detailed description of specific embodiments thereof when read in conjunction with the accompanying drawings, in which:

FIG. 4 is an enlarged view of a portion of the sheath system of FIG. 1;

FIG. 5 is a schematic view of an apparatus of this invention for providing a laminate comprising a corrosion-resistant metallic material and a composite adhesive film;

FIG. 6 is a detail view of a portion of the apparatus shown in FIG. 5; and

FIG. 7 is a schematic view of a manufacturing line for making a corrosion and rodent-resistant bonded sheath cable.

DETAILED DESCRIPTION

Figure 1:
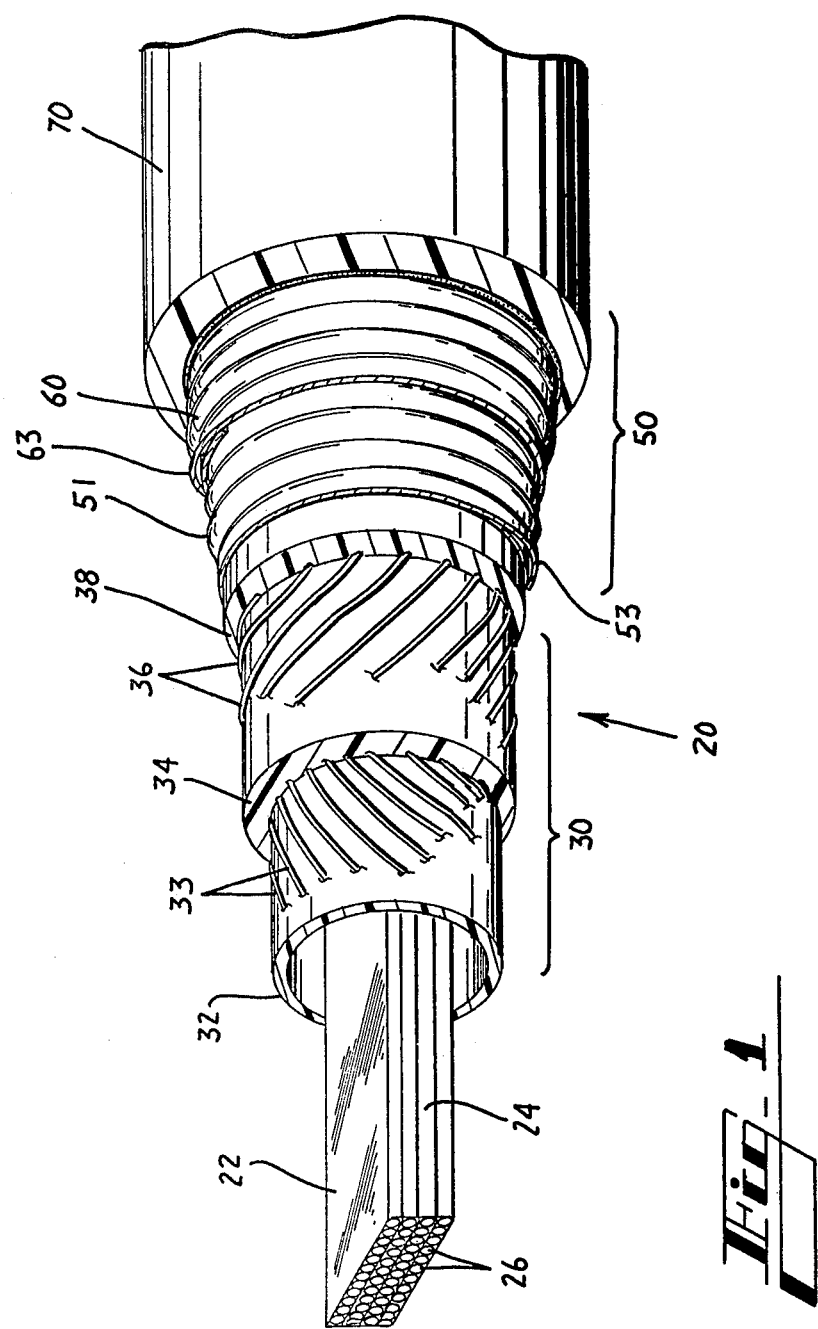
FIG. 1 is a perspective view of a corrosion and rodent-resistant cable having a bonded sheath system which is made by the methods and apparatus of this invention.
Figure 2:
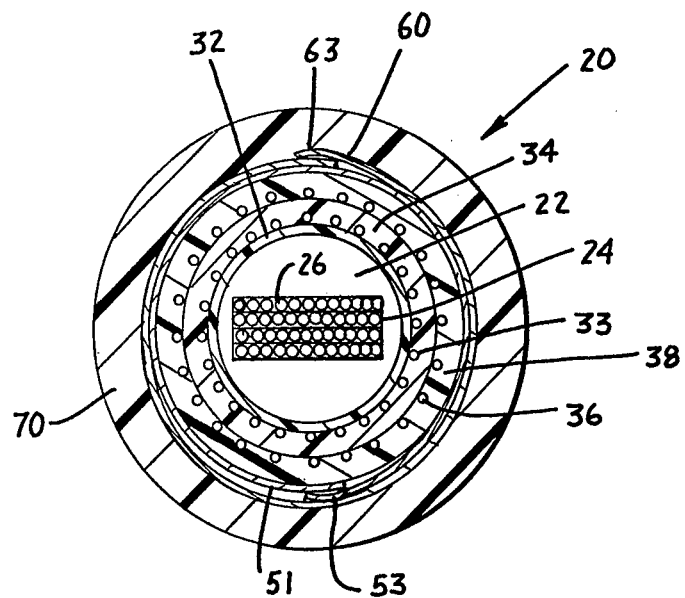
FIGS. 2-3 are end views in section of cables which include the sheath system which is made by the methods and apparatus of this invention.

Referring now to FIGS. 1 and 2, there is shown a lightguide cable which is designated generally by the numeral 20 and which is made by the methods and apparatus of this invention. The cable 20 includes a core 22 which includes a plurality of lightguide fiber ribbons 24—24. Each of the ribbons 24—24 includes an array of coated lightguide fiber 26—26. Although the cable 20 to be described herein is a lightguide fiber cable, it should be understood that it could be a cable in which the conductors are insulated copper conductors, for example.

Surrounding the core 22 is an inner sheath system which is designated generally by the numeral 30 and which includes a heat barrier layer 32 that is made of an insulative material such as polyvinyl chloride (PVC). A plurality of strength members 33—33, which may be made of steel, are wrapped helically about the layer 32. Over the strength members 33—33 is extruded an inner jacket 34 which is made of a plastic material such as polyethylene. Over the jacket 34 are wrapped another plurality of strength members 36—36. A jacket 38 is extruded over the second plurality of strength members 36—36 to complete an inner sheath system.

Figure 3:
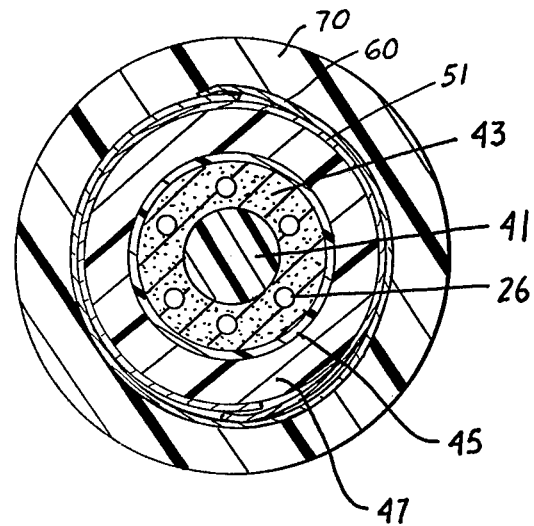

In FIG. 3 there is shown a lightguide cable having a different core arrangement. A strength member 41 is disposed along the longitudinal axis of the cable and has a plurality of lightguide fibers 26—26 stranded thereabout and enclosed in a waterproofing composition 43. A protective unit tube 45 is formed about the filling material. Then an inner jacket 47 comprising a polyethylene plastic material is extruded about the tube 45.

Returning now to FIGS. 1 and 2, it can be seen that an outer sheath system 50 which provides rodent and lightning protection and which is disclosed in the hereinbefore-mentioned W. D. Bohannon, Jr. et al. application filed of even date herewith includes an inner shield 51. The inner shield 51 encloses the core, is corrugated and has a longitudinal overlapped seam 53.

Surrounding the inner shield 51 is an outer shield 60 (see again FIGS. 1 and 2) which is to become bonded to a subsequently applied plastic jacket to provide enhanced protection against rodents and against lightning impact. It is made from a laminate 61 of an adhesive system 62 and of a metallic material 64 (see FIG. 4). The outer shield 60 which has a thickness of 0.008 inch, is corrugated and has a longitudinal overlapped seam 63. The metallic layer 64 of the outer shield 60 is comprised of a material which is corrosion-resistant and which in a preferred embodiment is stainless steel. In a preferred embodiment, the adhesive system 62 includes a dual film layer which comprises a first adhesive material 66 and a second adhesive material 68.

Typically, commercially available stainless steel has an outer layer 65 (see FIG. 4) which comprises chromium and iron oxides and which is adhered to the base metal of the steel. The oxide surface layer which provides corrosion protection is relatively thin, perhaps on the order of 20 to 40 Angstroms and may be nonuniform.

For an outer covering, the cable 20 is provided with a jacket 70 which in a preferred embodiment is made of a plastic material such as, for example, linear low density polyethylene material having a density in the range of 0.910–0.940 gm/cm$^3$. The jacket 70 which is caused to become bonded to the outer shield 60 by the carrier 68 has a thickness in the range of about 0.050 to 0.060 inch for the lightguide fiber cable described herein. The bonded jacket provides the cable with mechanical robustness.

If a corrosion-resistant metallic tape which is wrapped longitudinally about a core to form a shield is bonded to a plastic jacket, the longitudinally seamed shield is better able to withstand rodent attack, even on cables in the critical size range. Adhesive bonding between the jacket and a carbon steel shield has been of considerable help with respect to buckling resistance in copper core cables. Further, because it adds considerable mechanical support to the tube geometry of the steel, bonding improves crush resistance and tends to hold the overlapped seam closed, thereby overcoming a major concern with respect to rodent resistance. Finally, bonding prevents the wholesale removal of the plastic jacket by rodents, necessitating its removal laboriously from each elemental area. This greatly increases the work necessary to violate the sheath and thus impedes the progress of chewing rodents.

Problems have been experienced in achieving a suitable bond of a plastic jacket to stainless steel. The oxide layer 65 may be non-uniform and may not provide active sites to which an adhesive will bond with a peel strength which is sufficiently high so that delamination does not occur when the outer shield 60 is corrugated and formed about the inner shield 51.

This problem has been overcome by treating the stainless steel in accordance with the methods and apparatus of this invention. They provide an enhanced oxide surface layer 65 (see FIG. 4) which has at least a minimum thickness that will result in a predetermined peel strength. Further, the enhanced oxide layer 65 provides sufficient active sites to which acid functions in the adhesive layer 66 bond to achieve a suitable adhesion between the metallic layer 64 and the adhesive system 62.

In a method of making the cable 20 of this invention, the laminate 61 is assembled first on an apparatus designated generally by the numeral 80 (see FIG. 5). As can be seen in FIG. 5, a strip 81 of stainless steel from a supply 82 is advanced at a line speed of about 100 feet per minute past rollers 83—83, a welding fixture 84 and a metal guide 86. One such stainless steel material is referred to as alloy 304. Stainless steel may be characterized as being an iron-based alloy with a chromium content in the range of about 12% to 30% of weight. It has been determined that for the outer stainless steel shield to provide effect resistance against corrosion and against rodents, it should have an elongation in excess of 30% and a tensile strength in excess of 70,000 psi. The stainless steel which is used for the cable 20 has an elongation of 55%, a yield strength of 35,000 psi, a tensile strength of 85,000 psi, and a chromium content of at least 12% by weight.

The sought-after bond between the adhesive system 62 and the metallic layer 64 is helped also by using a stainless steel in which the outer surface of the metallic layer 64 has a relatively coarse, as opposed to a polished surface. This surface topography allows mechanical interlocking and provides more surface area for bonding between chemically similar functions of the oxide layer 65 and constituents of the adhesive system 62.

Then the metal strip 81 is moved through a preheating device 87 such as a quartz heater, for example, which heats the strip to a temperature in the range of 400° to 550° F. The heating causes the oxide layer 65 at the outer surface of the stainless steel to have enhanced receptivity to bonding. The first adhesive material 66 is to become bonded to the oxide surface layer 65 and not to the base metal. The oxide layer 65 may be comprised of those oxides which provide active sites for bonding, such as, for example, chromium oxides or it may have a thickness lying in an optimum range. If within this range of thickness, the oxide layer is cohesive and there is less chance for the base metal, to which the adhesive does not bond well, to become exposed. On the other hand, if too thick, the oxide layer becomes too fragile and bond strength decreases. It is believed that this treatment causes the oxide layer to have at least a minimum average thickness and to render it more attractive to polar functions of the adhesive system 62. Should the temperature exceed this range, iron oxides may form and impair the bonding. The preheating of the strip 81 also removes any moisture at the surface of the stainless steel.

From the heating device 87, the steel strip 81 is moved past preheat rollers 88 and 89 and into the nip between a set of pinch rollers 91—91. At its entry between the rollers 91—91, the steel strip 81 has a temperature of about 250° F. At the pinch rollers 91—91, the steel strip is brought into engagement with a strip 92 which comprises the adhesive system 62 and which is provided by a supply 93.

As will be recalled, the adhesive system 62 includes a first adhesive material 66 and a second adhesive material 68. The first adhesive material is one which bonds suitably to the oxide layer 65 of the metallic material 64. A peel strength between the two is predetermined to allow a supply tape of a laminate 61 to be corrugated and formed into the outer shield 60 without delamination occuring. Also, the second adhesive material is chosen to be compatible with the jacket 70. In the preferred embodiment, the first adhesive material 66 is a terpolymer which comprises an ethylenically unsaturated carboxylic acid, an ester of an ethylenically unsaturated carboxylic acid and ethylene. See U.S. Pat. No. 4,122,248 which is incorporated by reference hereinto. Specifically, it comprises about 85–90% by weight of ethylene, about 3–5% by weight of an acrylic acid and an acrylic acid ester. The acrylic acid and the acrylic acid ester together comprise about 10–15% by weight of the terpolymer. The second adhesive material 68 is referred to as a carrier and comprises a low or a linear low density polyethylene plastic material. Linear low density polyethylene plastic material has a density in the range of 0.910–0.940 gm/cm$^3$ and includes a significant number of short chain branches. The temperature to which the steel strip 81 is preheated exceeds the melting points of the first adhesive material and of the second adhesive material.

As can be seen in FIG. 5, the strip 92 is advanced from the supply 93 through a tension device 94, past rollers 96—96, through a film guide 97 and into juxtaposition with the steel strip 81 between the rollers 91—91. It should be noted that the orientation of the strip 92 is important. As can be observed from FIG. 6, it is oriented so that the carrier 68 engages the roller 91 and the first adhesive material 66 faces and becomes adhered to the steel strip 81. Advantageously, the melting point of the carrier 68 and the temperature used for the rollers 91—91 are such that the carrier 68 does not adhere to the rollers. This allows the lamination of a coextruded film to the steel strip without contaminating the equipment.

The rollers 91—91 are at an elevated temperature to heat the composite adhesive strip 62 and the steel strip 81 to a temperature in the range of about 200°–220° F. which is below the melting point of the first adhesive layer 66. Also, the pinch rollers 91—91 in the preferred embodiment are supported to apply forces to the two strips to cause a pressure of about 100 psi.

From the rollers 91—91, the superimposed strips are advanced between a second set of pinch rollers 97—97 which further heat the strips and which apply a predetermined pressure thereto. The rollers 97—97 are effective to heat the two strips to a temperature of about 290° F. and to cause a pressure of about 100 psi to be applied thereto. The temperature is less than the melting point of the carrier 68. As the steel strip 81 and dual adhesive strip 92 leave the rollers 97—97 they are bonded to each other to form the laminate which is used to form the outer cable shield 60. The laminate is moved past a guide 98 and onto a takeup 99.

The laminating process of this invention is carried out under the application of predetermined pressure and temperature. In order to provide the laminated steel strip over which the plastic jacket 70 is extruded, a dual adhesive is used. The polyethylene carrier 68 has a melting point of about 315° F. which is about 50° higher than that of the terpolymer layer 66. During laminating, the first set of rollers 91—91 is at a lower temperature than the second set of rollers 97—97. During the passage through the first set of rollers 91—91, the dual layer adhesive is prestuck to the stainless steel. If this is not done, air bubbles between the strip 92 and the steel strip 81 would insulate the adhesive strip from the steel and the heat energy from the rollers would cause the carrier to melt. This could be avoided by using a higher melting point carrier material, but that would require the use of a higher density polyethylene plastic material for the jacket, or by extruding the jacket at temperatures which are higher than those advisable for the polyethylene. Undesirably, the use of a higher density polyethylene, which has a higher viscosity, requires higher extrusion temperatures and may result in low temperature jacket failures in the field. However, with the presticking step, the stainless steel acts as a heat sink to dissipate the heat and prevent the melting of the carrier. As a result of this laminating process, it is possible to use a linear low density polyethylene for the jacket and still obtain a suitable bond with the stainless steel strip.

Going now to FIG. 7, there is shown a manufacturing line 100 for applying the shields 51 and 60 to the core 22 which is enclosed in the inner sheath system 30. The core 22 having the inner tube and strength members wrapped thereabout is moved from a supply 102 through a device 104 which forms a metallic tape into the inner shield 51. In the preferred embodiment, the inner shield is made of a metallic material having a relatively high thermal capacity and a relatively low electrical resistivity, such as copper, and has a thickness of about 0.006 inch.

A measure of the thermal capacity of the material from which the shield is formed is a parameter designated U/V, which is energy per unit volume required to raise a material from an ambient temperature to a molten state. For copper, this parameter is about 80 to 90 BTU/in$^3$. Resistivity is a measure of the ability to conduct current efficiently. The smaller the value, the better the electrical conductivity, which is the reciprocal of resistivity. The resistivity of copper is about 0.156 ohm grams m$^2$, whereas for aluminum it is about 0.234.

The parameters of thermal capacity and electrical resistivity are important to the capability of the cable to resist lightning damage. Lightning damage may occur because of electrical energy induced in the shield by lightning strikes. It is important that the electrical energy accompanying the strike be dissipated as quickly as possible; otherwise, arcing may occur from the shield to the strength wires and cause damage to the lightguide fibers.

Into the forming device 104 is advanced a corrugated copper tape 106. The tape 106 is provided by a supply 107 and is fed through a corrugator 108. At the forming device 104, which may be that disclosed and claimed in U.S. Pat. No. 4,308,662 which issued Jan. 5, 1982 to W. D. Bohannon, Jr., the copper tape 106 is wrapped about the covered core to form the longitudinal overlapped seam 53. From there, the shielded core 22 is advanced through a second forming device 110 into which a tape 111 comprising a stainless steel adhesive laminate formed by the apparatus 80 is fed. The tape 111 is advanced from a supply 112 into a corrugator 114. The second forming device 110 causes the laminate 60 to be wrapped about the copper shield 51 with an overlapped seam 63 which is displaced preferably about 180° from that of the copper shield. Also, as can be seen in FIG. 2, the outer longitudinal edge portion of the shield 60 is directed inwardly toward the core and is supported by the underlying edge portion.

Then, the double shielded core is advanced through an extruder 115 which causes the jacket of polyethylene material to be formed thereabout. The heat of extrusion causes the jacket 70 to become bonded to the carrier 68 of the laminated outer shield 60. The outer metallic shield 60 is bonded to the plastic jacket 70 to provide a composite which exhibits excellent kinking and buckling resistance. This bonding also increases structural integrity to withstand crushing caused by lightning impact, for example, and abrading. The bonded construction substantially increases the difficulty of removal of portions of the jacket by a rodent. The jacketed cable 20 is moved through a cooling trough 116 by a capstan 117. Then, the jacket 70 is marked by a printer 118 and moved onto a takeup 119.

The sheath system 50 of this invention provides enhanced lightning protection. For a direct lightning hit, there is a discharge of electrical and thermal energies. As mentioned hereinbefore, the inner shield 51 has the capability of dissipating the thermal and electrical energy to reduce local heating at the strike location. Also as will be recalled during a lightning strike, moisture in the soil vaporizes from the heat of the lightning arc and expands, causing the so-called steamhammer effect in which the cable may be impacted and crimped. This is resisted by the bonded sheath system which is made by the methods and apparatus of this invention.

The laminated stainless steel which is made by the methods and apparatus of this invention passes several tests with respect to peel strength. First, there is a peel test in which a leading portion of the dual adhesive strip was retroflexed with respect to the underlying steel layer 64 and peeled from the steel layer. To pass this test, each inch of width of the dual adhesive must require at least three pounds to remove it from the steel. Secondly, a stainless steel sample was covered with the dual adhesive and a layer of polyethylene which simulated the jacket 70. The jacket 70 and adhesive were peeled from the underlying metal and the pounds of force required to do so were recorded. An acceptable result is 14 pounds per inch of width of film. Thirdly, a longitudinal strip of the jacket 70 and dual adhesive film were peeled from a stainless steel shield which enclosed an inner shield. In this instance, the shield was corrugated and an acceptable test result for lightguide fiber cables in which a longitudinal strip of the jacket 70 is peeled from the outer shield 60 is at least 6 pounds per inch of width. Each of the sample cables passed all three tests.

It is to be understood that the above-described arrangements are simply illustrative of the invention. Other arrangements may be devised by those skilled in the art which will embody the principles of the invention and fall within the spirit and scope thereof.

What is claimed is:

1. A method of making a laminate which is suitable for use in a cable sheath system, said method including the steps of:
    preheating a strip of a corrosion-resistant metallic material, which has at least a predetermined chromium content and a relatively high elongation, an oxide surface layer, and a relatively coarse outer surface, to a temperature within a predetermined range;
    moving a composite strip, which comprises a first adhesive material and a second adhesive material, and the strip of metallic material into engagement with each other with the first adhesive material engaging the strip of metallic material; while
    exposing the composite strip and the strip of metallic material to a first temperature and to a predetermined pressure; and then
    exposing the composite strip and the strip of metallic material to a second temperature that is higher than the first and to the predetermined pressure to form a laminate comprising the composite adhesive strip and the strip of metallic material.

2. The method of claim 1, wherein said metallic material comprises an iron-based alloy which includes chromium in the range of about 12 to 30 percent by weight.

3. The method of claim 2, wherein said metallic material is made of a metal having an elongation of 55% and a tensile strength of about 85,000 psi.

4. The method of claim 2, wherein the preheating is accomplished with a temperature which is greater than the melting point of the first adhesive material and of the second adhesive material.

5. The method of claim 4, wherein said strip of metallic material is preheated to a temperature in the range of about 400° to 550° F.

6. The method of claim 5, wherein said step of preheating enhances the oxide layer to cause said oxide layer to have sufficient adhesion to the base metal of the metallic material and to the first adhesive material to provide the laminate with a predetermined peel strength.

7. The method of claim 6, wherein the predetermined peel strength is at least three pounds per inch of width of the laminate.

8. The method of claim 6, wherein the step of exposing the composite strip and the strip of metallic material to a first temperature is accomplished by moving them between a pair of rollers which cooperate to cause them to be subjected to the predetermined pressure.

9. The method of claim 8, wherein the step of exposing the composite strip and strip of metallic material to a second temperature is accomplished by moving them between a second pair of rollers which cooperate to apply the predetermined pressure.

10. The method of claim 9, wherein said first adhesive material is a terpolymer which comprises about 85–90% by weight of ethylene, about 3–5% by weight of an acrylic acid and an acrylic acid ester, wherein said acrylic acid and said acrylic acid ester comprise about 10–15% by weight of said terpolymer, and the second adhesive material is a linear low density polyethylene plastic material.

11. The method of claim 10, wherein said first temperature is less than the melting point of the first adhesive material of the composite strip and said temperature is less than the melting point of the second adhesive material of the composite strip.

12. The method of claim 11, wherein the first temperature is in the range of about 200° to 220° F.

13. The method of claim 11, wherein the second temperature is in the range of about 280°–300° F.

14. The method of claim 11, wherein the strip of second metallic material is moved between the pairs of rollers at a line speed of about 100 feet per minute.

15. A method of making a relativley small pair size cable which is rodent and lightning resistant, said method including the steps of claim 11, and further including the steps of:
    advancing a core along a path of travel;
    enclosing the core in a strip of a metallic material which is formed into an inner shield having a longitudinal overlapped seam and which has a relatively high thermal capacity and a relatively high conductivity;
    corrugating the laminate;
    enclosing the core and inner shield with the corrugated laminate by forming the laminate into an outer shield having a longitudinal overlapped seam with the second adhesive material facing outwardly; and
    extruding a plastic jacket to enclose the laminate and to cause the second adhesive material to bond the jacket to the outer shield.

16. The method of claim 15, wherein the composite adhesive strip and the strip of corrosion-resistant metallic material are caused to be subjected to a pressure of about 100 psi as they are moved between the rollers.

17. An apparatus for making an adhesive-metallic laminate which is suitable for use in a cable sheath system, said apparatus including;

means for advancing a strip of corrosion-resistant metallic material having a relatively high elongation and at least a predetermined chromium content, an oxide surface layer, and a relatively coarse outer surface and a composite strip of first and second adhesive materials along separate paths of travel and then along a common path of travel;

heating means disposed along the path of travel for the strip of corrosion-resistant metallic material for heating the corrosion-resistant metallic material to a temperature which enhances the oxide layer;

first roller means disposed along the common path of travel for causing the composite adhesive strip to become engaged with the strip of corrosion-resistant metallic material such that the first adhesive material is contiguous with the corrosion-resistant material, said first roller means being maintained at a first temperature and causing a predetermined pressure to be applied to the strips; and second roller means disposed along the common path of travel for causing the engaged strips to become laminated to each other, said first and second roller means causing the strips to be subjected to the predetermined pressure and being maintained at a second temperature.

18. The apparatus of claim 17, wherein said first and second roller means are maintained at temperatures within predetermined ranges to heat the strips with the temperature of said first roller means being less than that of said second roller means.

19. The apparatus of claim 18, wherein said first roller means is maintained at a temperature which is less than the melting point of the first adhesive material.

20. The apparatus of claim 18, wherein said second roller means is maintained at a temperature which is greater than the melting point of the first adhesive material and less than the melting point of the second adhesive material.

* * * * *